US005173791A

United States Patent [19]

Strathman et al.

[11] Patent Number: 5,173,791

[45] Date of Patent: Dec. 22, 1992

[54] LIQUID CRYSTAL DISPLAY PIXEL WITH A CAPACITIVE COMPENSATING TRANSISTOR FOR DRIVING TRANSISTOR

[75] Inventors: Lyle R. Strathman, Cedar Rapids; Gary D. Bishop, Marion, both of Iowa

[73] Assignee: Rockwell International Corporation, Seal Beach, Calif.

[21] Appl. No.: 749,233

[22] Filed: Aug. 23, 1991

[51] Int. Cl.[5] .......... G02F 1/1343

[52] U.S. Cl. .......... 359/57; 359/59; 340/784

[58] Field of Search .......... 359/55, 57, 59, 84, 359/87; 340/784

[56] References Cited

U.S. PATENT DOCUMENTS 4,470,667 9/1984 Okuba et al. .......... 359/67

FOREIGN PATENT DOCUMENTS 2-193121 7/1990 Japan .......... 359/59

OTHER PUBLICATIONS

*Compensative Addressing for Switching Distortion in a A-SI TFTLCD* by K. Suzuki in 7th Proceedings of the International Display Research Conference, 1987, pp. 107-109.

*A New Address Scheme to Improve the Display Quality of a-Si TFT/LCD Panels* by Y. Kaneko et al. in IEEE Transactions on Electron Devices, vol. 34, No. 12, Dec. 1989, pp. 2949-2952.

*Simplified Method of Capacitively Coupled Driving for TFT-LCD* by E. Takeda et al. in Japan Display, 1989, pp. 580-582.

*A 6.7-in. Square High Resolution Full Color TFT-LCD* by Y. Asai et al. in Japan Display, 1989, pp. 514-517.

*10.4-in. Diagonal Color TFT-LCDS without Residual Images* by Y. Kanemori et al. in SID 90 Digest, 1990, pp. 408-411.

*Primary Examiner*—William L. Sikes
*Assistant Examiner*—Ron Trice
*Attorney, Agent, or Firm*—John J. Horn; M. Lee Murrah; H. Fredrick Hamann

[57] ABSTRACT

An active matrix thin film transistor liquid crystal display having two thin film transistors for use in driving each of the liquid crystal pixels making up the matrix of the display. The first thin film transistor associated with each pixel is used in driving the pixel to capture data off of data lines in response to gate drive signals. The second thin film transistor associated with each pixel is used in compensating for the parasitic capacitances associated with the first thin film transistor and is driven by special compensating pulses.

6 Claims, 3 Drawing Sheets

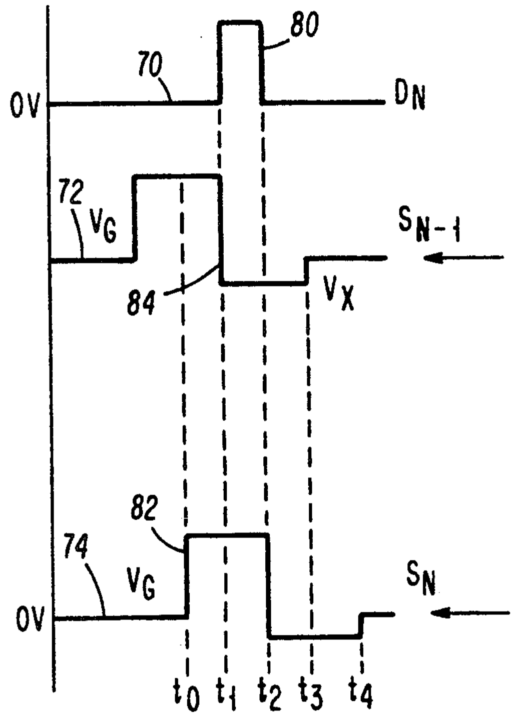
FIG. 3
FIG. 4
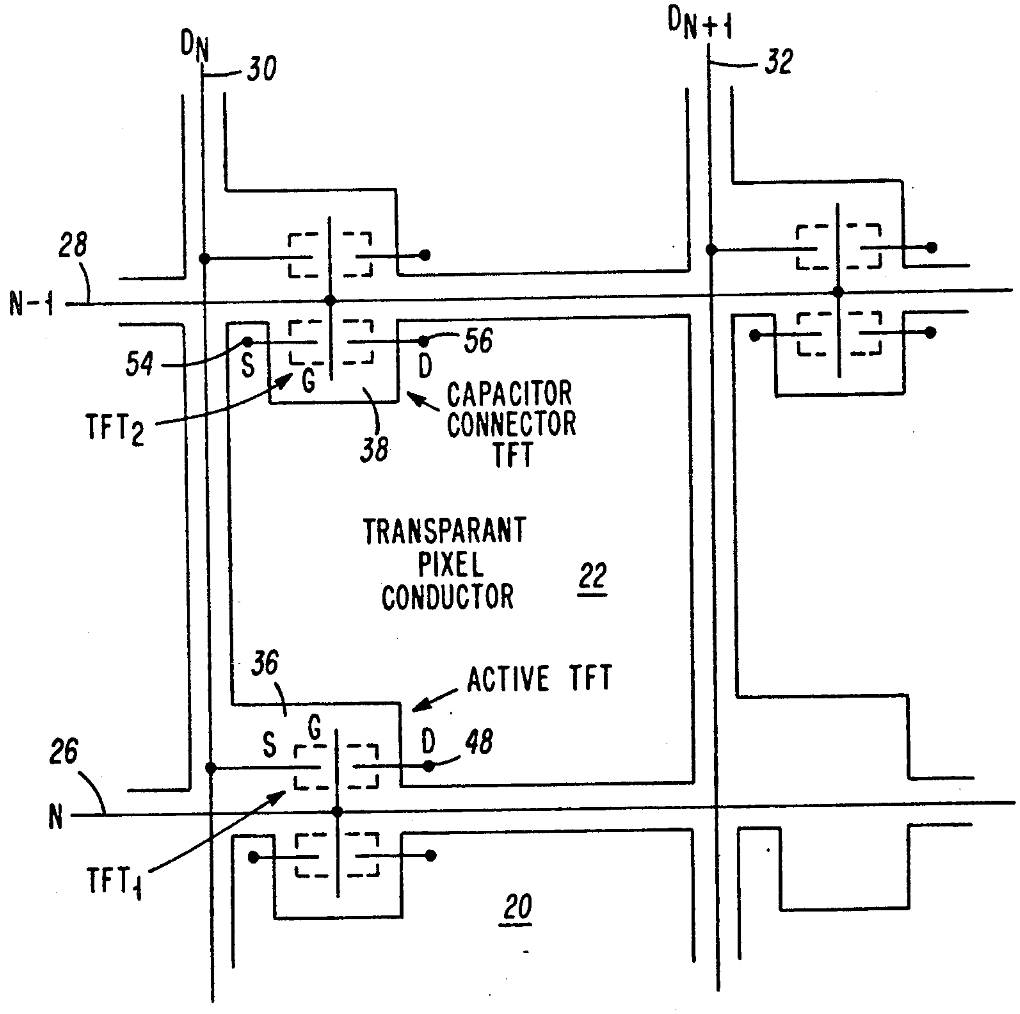

LIQUID CRYSTAL DISPLAY PIXEL WITH A CAPACITIVE COMPENSATING TRANSISTOR FOR DRIVING TRANSISTOR

BACKGROUND OF THE INVENTION

The present invention relates to liquid crystal displays and more particularly to systems for use in correcting for image retention and flicker problems exhibited by typical active matrix liquid crystal displays.

In most active matrix liquid crystal displays the data signals applied to the individual liquid crystal pixels are subject to distortion resulting from the gate-source capacitances which are characteristic of the thin filled transistors used in driving such pixels and the capacitances exhibited by the pixels themselves. As shown in FIG. 1, gate drive pulses 10 of amplitude $V_G$ are periodically applied to the scanning or select lines of a display matrix in order to enable data signals 12 of either positive or negative polarity to be applied to the pixel electrodes of the liquid crystal pixels in the matrix. However, the gate-source capacitances of the thin film transistors driving the pixels affect the waveform of the pixel drive signal 14 as charge is diverted at the falling edges of the gate drive pulses to satisfy the capacitance requirements of the gate-source junctions of the thin film transistors resulting in a voltage distortion $\Delta V$ in the voltage level at the pixel electrodes. The voltage distortion $\Delta V$ constitutes a DC offset having longer term effects on the liquid crystal pixels and resulting in significantly degraded image quality due to image retention and flicker.

In accordance with past practices for correcting this problem small DC bias voltages have been applied across liquid crystal display matrixes in an attempt to compensate for the voltage distortion $\Delta V$. However, this technique has not proven entirely satisfactory since the amount of voltage distortion exhibited by each pixel is a function of the construction of the individual liquid crystal pixels and more importantly is a non-linear function of the data signal voltage level. Consequently, in active matrix liquid crystal displays in which data voltages are controlled to provide a gray scale for use in furnishing enhanced images, the bias voltage to be applied across the matrix for compensating for the voltage distortion due to the inherent parasitic capacitances can only be approximated to an average level resulting in continued image retention and flicker problems.

It is therefore an object of the present invention to provide a system for eliminating image retention and flicker problems in active matrix liquid crystal displays.

It is another object of the present invention to provide a construction for a liquid crystal display matrix including devices and methods for accurately compensating on a pixel-by-pixel basis for the parasitic gate-source capacitances of the thin film transistors used in driving the liquid crystal pixels in the matrix.

It is a further object of the present invention to provide a system for suppressing image retention and flicker problems in active matrix liquid crystal displays which is simple in operation and can be readily implemented into a liquid crystal matrix designs at minimum expense and with a minimum of effort.

SUMMARY OF THE INVENTION

The present invention constitutes an improvement to the pixel modules used in active matrix thin film transistor liquid crystal displays having a plurality of pixel modules positioned with reference to (n−1)th and (n)th scanning lines which bracket said pixels in a display matrix and wherein gate drive signals are sequentially applied to the scanning lines. The pixel module of the present invention includes a liquid crystal pixel having a pixel electrode, a first thin film transistor for driving said pixel and a second thin film transistor for compensating for parasitic capacitances. The first thin film transistor is located in proximity to said pixel and has its gate connected to (n)th scanning line and its drain connected to said pixel electrode. The second thin film transistor is also located in proximity to said pixel and has its gate connected to the (n−1)th scanning line and its drain and source interconnected with the pixel electrode. Gate drive signals are applied to the scanning lines which include drive pulses and compensating pulses of opposite polarity for operating the first thin film transistor to capture data to the liquid crystal pixel and operating the second thin film transistor for compensating for the parasitic capacitances inherent in the first thin film transistor as well as the liquid crystal pixel. The compensating pulses are applied to the (n−1)th scanning line and are timed to overlap and follow the drive pulses applied to the (n)th scanning line.

In operation, the charges accumulated due to the parasitic capacitances of the second thin film transistors counteract and offset the charges required to satisfy the parasitic capacitances of the first thin film transistors at the falling edges of the drive pulses. In the preferred embodiment, the second thin film transistors are constructed to have parasitic capacitances approximately four times the capacitances characteristic of the first thin film transistors and the compensating pulses are configured to have amplitudes approximately one quarter the amplitudes of the drive pulses.

BRIEF DESCRIPTION OF THE DRAWINGS

FIG. 3 provides a graphical illustration of the waveforms of the gate drive signals applied to the scanning lines of an active matrix liquid crystal display in accordance with the principles of the present invention showing especially the timing of the pulses applied to sequential scanning lines.

FIG. 4 is a diagramatic illustration of a single pixel module and its surrounding environment in an active matrix liquid crystal display in accordance with the present invention showing the layout of the thin film transistors relative to the pixel structure.

DESCRIPTION FOR THE PREFERRED EMBODIMENT

Figure 1:
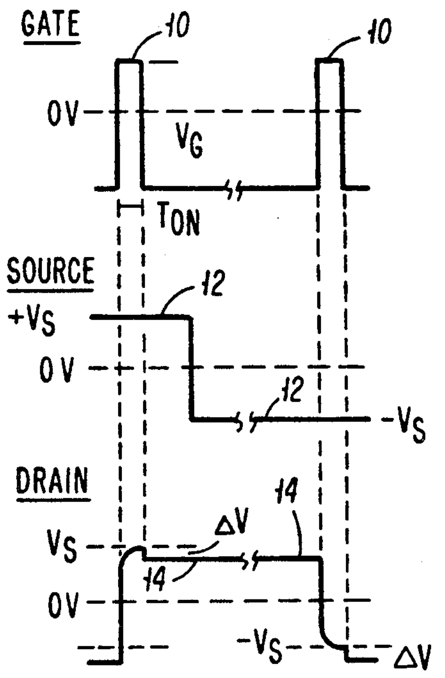
FIG. 1 provides a graphical illustration of the gate drive, data and pixel electrode (and drain voltage) waveforms typical of prior art active matrix liquid crystal displays showing especially the distortion due to parasitic capacitances.
Figure 2:
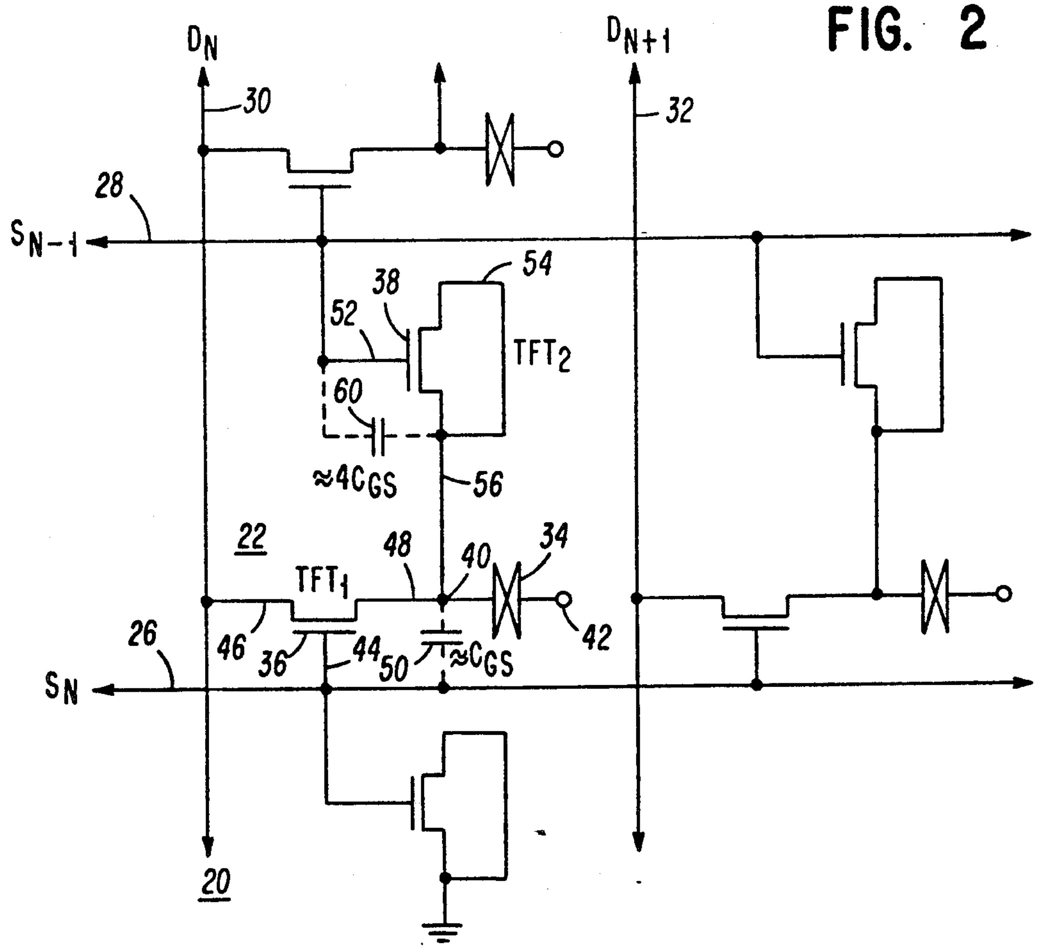
FIG. 2 provides a diagramatic illustration of a single pixel module and its surrounding environment in an active matrix liquid crystal display in accordance with the principles of the present invention.

Referring now to FIG. 2, a liquid crystal display matrix 20 includes individual pixel modules as represented by the module 22 which are positioned in between scanning lines 26 and 28 adapted for carrying gate drive signals to the pixel modules and data lines 30 and 32 adapted for delivering data signals to the pixel modules. The pixel modules are all similarly constructed including a liquid crystal pixel 34, a first thin film transistor 36 and a second thin film transistor 38. The liquid crystal pixel 34 includes a pixel electrode 40 and a counter electrode 42 which represents a common terminal between all of the pixel modules in the matrix 20.

The thin film transistor 36 includes a gate 44 connected to the scanning line 26 for receiving a gate drive signal $S_N$, a source 46 connected to the data line 30 for receiving a data signal $D_N$ and a drain 48 connected to the pixel electrode 40. The thin film transistor 36 exhibits a characteristic capacitance between its gate and source $C_{GS}$ (or its gate and drain) as indicated by the phantom capacitor 50.

The thin film transistor 38 includes a gate 52 connected to the scanning line 28 for receiving a gate drive signal $S_{N-1}$ and has its source 54 interconnected to its drain 56 which is in turn connected to the pixel electrode 40. The thin film transistor 38 is constructed to have a characteristic capacitance between its gate and its drain and source of approximately 4 $C_{GS}$ as indicated by the phantom capacitor 60.

Referring now to FIG. 3, the waveforms 70, 72 and 74 correspond to the data signal $D_N$ applied on the line 30 and the gate drive signals $S_{N-1}$ and $S_N$ applied on the lines 28 and 26. The data signal $D_N$ includes a typical data pulse 80 which extends from time $t_2$ to time $t_3$. The gate drive signal $S_N$ includes a drive pulse 82 extending between times $t_0$ to $t_2$ for capturing whatever data may be furnished by the signal $D_N$ and applying the same to the pixel 34. However, the gate drive signals also include compensating pulses which effect the operation of the pixel modules connected to the next succeeding scanning line. For instance, the compensating pulse 84 of the gate drive signal $S_{N-1}$ which extends between times $t_1$ and $t_3$ effects the operation of the pixel module 22 which is otherwise controlled by the signal $S_N$ on line 26.

In operation, the drive signal $S_N$ applied to line 26 operates on the transistor 36 to "latch" data provided by the data signal $D_N$ off of the line 30 between times $t_1$ and $t_2$ and apply the same to the pixel electrode 40. However, at the falling edge of the drive pulse 82, the operation of the pixel module 22 may be affected by parasitic capacitances such as and primarily the gate-source capacitance $C_{GS}$ of the thin film transistor 36. The operation of the thin film transistor 38 compensates for this capacitance in accordance with the effects of the compensating pulse 84. Since the compensating pulse 84 is of opposite polarity from the drive pulse 82, the charge accumulated by the combined gate-source and gate-drain capacitance of the thin film transistor 38 is of opposite polarity from the charge required to satisfy the gate-source capacitance of the thin film transistor 36 at the falling edge of the drive pulse 82. Further, since the combined gate-source and the gate-drain capacitance of the thin film transistor 38 is approximately four times the gate-source capacitance of the thin film transistor 36 and since the compensating pulse 38 is configured to have an amplitude $V_X$ which is approximately one-quarter the amplitude of the drive pulse $V_G$, the charge drawn off by the gate source capacitance of the transistor 36 is approximately equal to the charge available and supplied by the combined gate-source and the gate-drain capacitance of the transistor 38. Consequently, the voltage level applied to the pixel electrode 40 in accordance with the data signal $D_N$ remains substantially constant despite the fall in gate drive voltage supplied by the signal $S_N$.

Referring now to FIG. 4, the physical configuration of the liquid crystal display matrix 20 and the pixel module 22 in relation to the film transistors 36 and 38 is more accurately shown. The thin film transistor 36 is positioned in one corner of the pixel module 22 in proximity to both the scanning line 26 carrying the drive signal $S_N$ and the data line 30 carrying the data signal $D_N$. The thin film transistor 38 is located in proximity to the scanning line 28 carrying the drive signal $S_{N-1}$. The source 54 and drain 56 of the transistor 38 and the drain 48 of the transistor 36 are all interconnected by the transparent Indium-Tin-Oxide layer of the pixel 34.

Figure 5A:
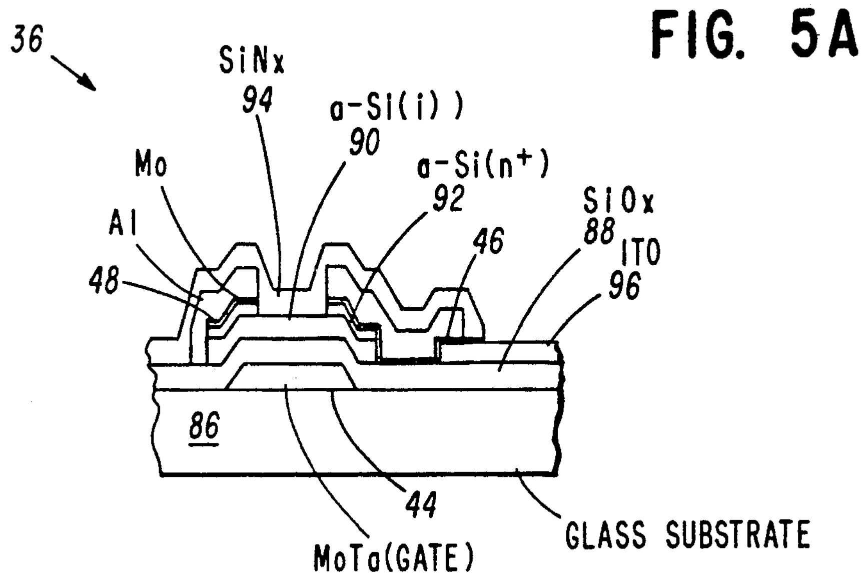
FIGS. 5A and 5B provide cross sectional views of the construction of typical thin film transistors which might be used in a pixel module for capturing data and compensating for capacitances in accordance with the principles of the present invention.
Figure 5B:
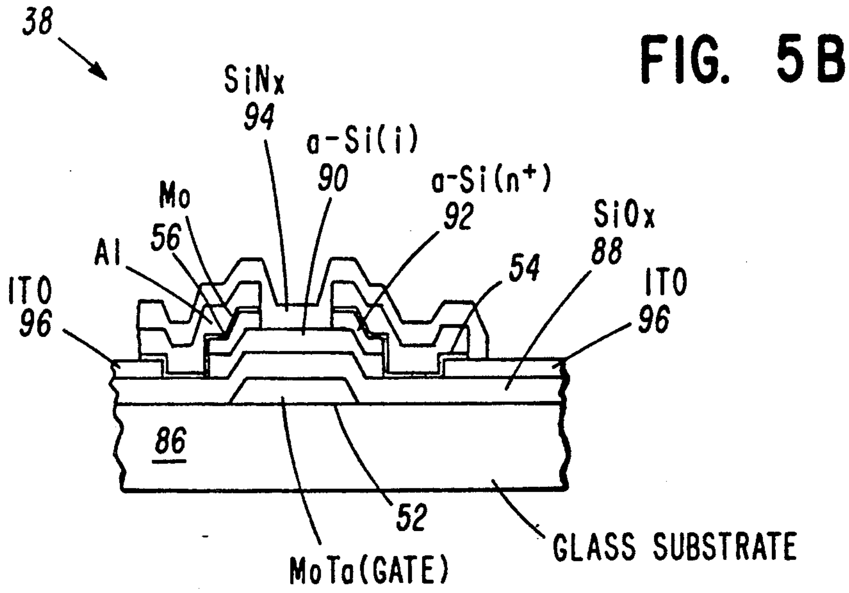

Referring now to FIGS. 5A and 5B, typical constructions are shown for the thin film transistors 36 and 38, respectively. Both of the thin film transistors 36 and 38 are formed on a glass substrate 86 and have configurations which may be characterized as inverted-staggered structures. Both of the transistors 36 and 38 include gates 44 and 52 constructed of MoTa and sources 46 and 54 and drains 48 and 56 constructed of Mo. The gates 44 and 52 are overlaid by a layer 88 of gate insulator material such as SiOx. A layer 90 of undoped amorphous silicon a-Si(i) and a layer 92 of doped amorphous silicon a-Si(n+) extend between the gates 44 and 52 and the sources and drains 46, 48, 54 and 56. A passivation layer 94 of silicon nitride SiNx overlays the structures of both of the transistors 36 and 38. In the thin film transistor 36 the source 46 is connected directly to the Indium-Tin-Oxide (ITO) layer 96 of the pixel 34 while in the thin film transistor 38 both the source 54 and the drain 56 are connected directly to the conductive Indium-Tin-Oxide layer 96 of the pixel 34.

We claim:

1. In an active matrix thin film transistor liquid crystal display having a plurality of scanning lines and a plurality of liquid crystal pixels located in between said scanning lines each of which pixels is associated with a first thin film transistor operative for driving the pixel with which the first thin film transistor is associated and having a gate connected to the (n)th scanning line and a drain connected to the pixel electrode of said liquid crystal pixel, the improvement comprising:

a plurality of second thin film transistors each of which is associated with one of said liquid crystal pixels and each of which has the gate of the second thin film transistor connected to the (n−1)th scanning line and has the drain of the second thin film transistor connected to the source of the second thin film transistor and to the pixel electrode of the pixel with which the second thin film transistor is associated; and means for generating gate drive signals for application to said scanning lines which include primary drive pulses and compensating pulses of opposite polarity immediately following said drive pulses, said compensating pulses on the (n−1)th scanning lines substantially overlapping the drive pulses on the (n)th scanning lines.

2. The improvement of claim 1, wherein the combined gate to source and gate to drain capacitance of said second thin film transistors is approximately four times the gate to source capacitance of said first thin film transistors and said compensating pulses have approximately one quarter the amplitude of said drive pulses.

3. The improvement of claim 1, wherein said pixels include conductive Indium-Tin-Oxide layers and the drains and sources of said second thin film transistors are interconnected by way of said Indium-Tin-Oxide layers.

4. A pixel module for use in an active matrix thin film transistor liquid crystal display having a plurality of pixel modules positioned with reference to (n−1)th and (n)th scanning lines which bracket said pixels in a display matrix and wherein gate drive signals are applied to the scanning lines which include drive pulses and compensating pulses of opposite polarity, said module comprising:

a liquid crystal pixel having a pixel electrode;

a first thin film transistor for driving said pixel located in proximity to said pixel and having the gate of the first thin film transistor connected to the (n)th scanning line and the drain of the first thin film transistor connected to said pixel electrode;

a second thin film transistor for compensating parasitic capacitances located in proximity to said pixel and having the gate of the second thin film transistor connected to the (n−1)th scanning line and the drain and source of the second thin film transistor connected to said pixel electrode.

5. The pixel module of claim 4, wherein the combined gate to source and gate to drain capacitance of said second thin film transistors is approximately four times the gate to source capacitance of said first thin film transistors.

6. The pixel module of claim 5, wherein said compensating pulses are approximately one-quarter the amplitude of said drive pulses and the compensating pulses applied to the (n−1)th scanning lines substantially overlap the drive pulses applied to the (n)th scanning lines.

* * * * *